(12) United States Patent
Park

(10) Patent No.: US 10,754,537 B2
(45) Date of Patent: Aug. 25, 2020

(54) METHOD AND APPARATUS FOR PROCESSING HUMAN INTERFACE DEVICE (HID)-BASED DATA USING HIGH-SPEED INTERFACE

(71) Applicant: LG ELECTRONICS INC., Seoul (KR)

(72) Inventor: Jangwoong Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 65 days.

(21) Appl. No.: 15/760,365

(22) PCT Filed: Sep. 19, 2016

(86) PCT No.: PCT/KR2016/010428
§ 371 (c)(1),
(2) Date: Mar. 15, 2018

(87) PCT Pub. No.: WO2017/048106
PCT Pub. Date: Mar. 23, 2017

(65) Prior Publication Data
US 2019/0050130 A1 Feb. 14, 2019

Related U.S. Application Data

(60) Provisional application No. 62/219,174, filed on Sep. 16, 2015.

(51) Int. Cl.
*G06F 3/041* (2006.01)
*H04N 5/765* (2006.01)
(Continued)

(52) U.S. Cl.
CPC ............ *G06F 3/0488* (2013.01); *G06F 3/038* (2013.01); *G06F 3/0416* (2013.01);
(Continued)

(58) Field of Classification Search
CPC ..... G06F 3/0488; G06F 13/102; H04N 5/765; H04N 21/41407; H04N 21/42224; H04N 21/43635
See application file for complete search history.

(56) References Cited

U.S. PATENT DOCUMENTS 10,162,769 B2 * 12/2018 Yang ..................... G06F 13/102
2007/0065093 A1 * 3/2007 Takatori ............... H04N 7/1675
386/255

(Continued)

FOREIGN PATENT DOCUMENTS

JP 2009-124705 A 6/2009
JP 2011-13396 A 1/2011
(Continued)

*Primary Examiner* — Mihir K Rayan
(74) *Attorney, Agent, or Firm* — Birch, Stewart, Kolasch & Birch, LLP

(57) ABSTRACT

The present invention provides a method for processing Human Interface Device (HID) data on a high-speed interface performed by a sink device including permitting a use of a Human Interface Device (HID) on a user interface of the sink device to control a user interface of a source device; receiving a request for initial configuration information of the HID from the source device; in response to the request, transmitting the initial configuration information of the HID to the source device; receiving operable configuration information from the source device, and the operable configuration information indicates configuration information of the source device which is matched to the initial configuration information of the HID; and controlling the user interface of the source device according to an input signal of the HID based on the operable configuration information.

10 Claims, 19 Drawing Sheets

(51) Int. Cl.
*G06F 3/0488* (2013.01)
*H04N 21/4363* (2011.01)
*G06F 3/038* (2013.01)
*H04N 21/422* (2011.01)
*H04N 21/414* (2011.01)
*G06F 13/10* (2006.01)

(52) U.S. Cl.
CPC ........... *G06F 13/102* (2013.01); *H04N 5/765* (2013.01); *H04N 21/41407* (2013.01); *H04N 21/42224* (2013.01); *H04N 21/43635* (2013.01)

(56) References Cited

U.S. PATENT DOCUMENTS

| | | | | |
|---|---|---|---|---|
| 2007/0186015 A1* | 8/2007 | Taft | ........................ | G09G 5/006 710/16 |
| 2007/0222779 A1* | 9/2007 | Fastert | ........................ | G06T 1/00 345/418 |
| 2007/0271525 A1* | 11/2007 | Han | ........................ | G06F 3/017 715/786 |
| 2009/0256963 A1* | 10/2009 | Sato | ........................ | H04N 5/4401 348/554 |
| 2012/0081301 A1* | 4/2012 | Lin | ........................ | G06F 3/0383 345/173 |
| 2012/0110518 A1* | 5/2012 | Chan | ........................ | G06F 3/018 715/863 |
| 2013/0159565 A1* | 6/2013 | Soyannwo | ............... | G06F 9/452 710/33 |
| 2013/0246665 A1* | 9/2013 | Lee | ........................ | G06F 3/038 710/11 |
| 2015/0046945 A1* | 2/2015 | Zhang | ............... | H04M 1/72519 725/37 |
| 2017/0092226 A1* | 3/2017 | Park | ........................ | G09G 5/006 |

FOREIGN PATENT DOCUMENTS

| | | |
|---|---|---|
| KR | 10-2007-0111592 A | 11/2007 |
| KR | 10-2012-0125657 A | 11/2012 |
| WO | 2012/099338 A2 | 7/2012 |

* cited by examiner

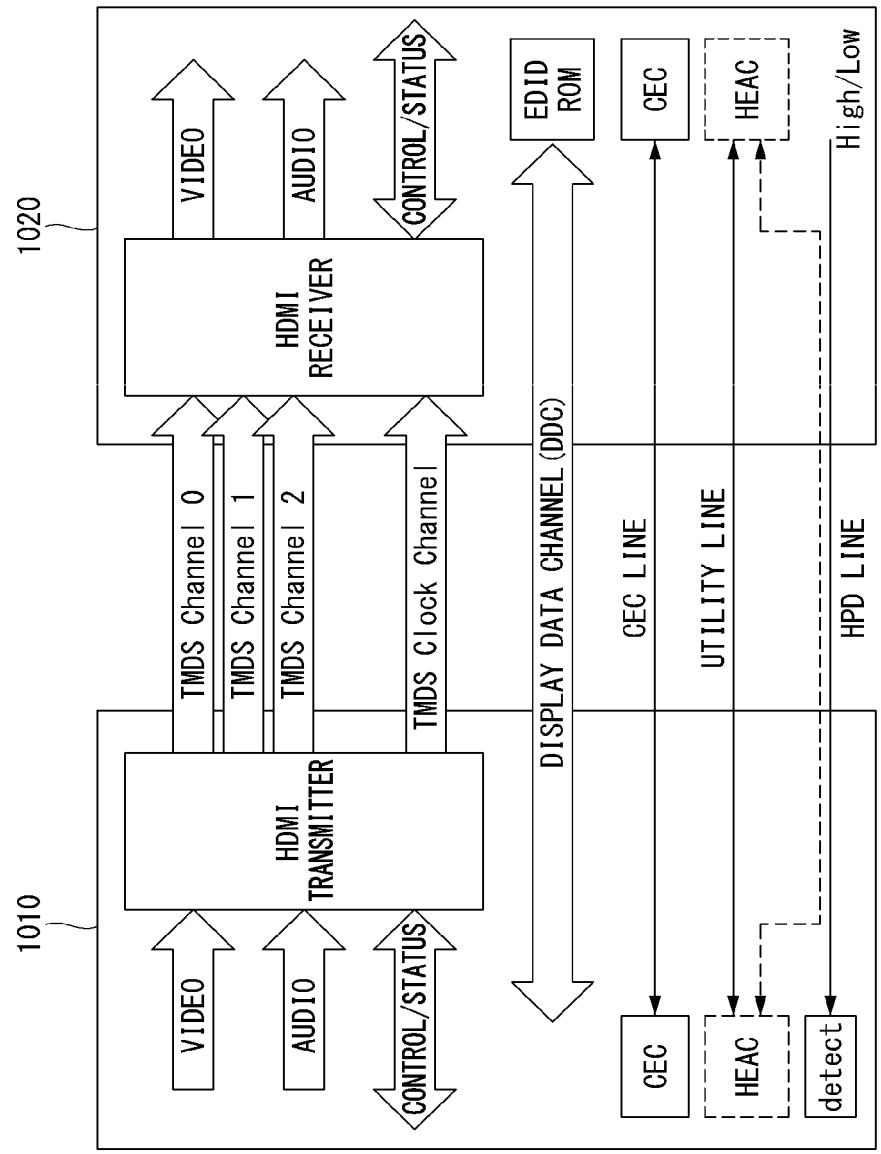
[Fig. 1]

[Fig. 2]
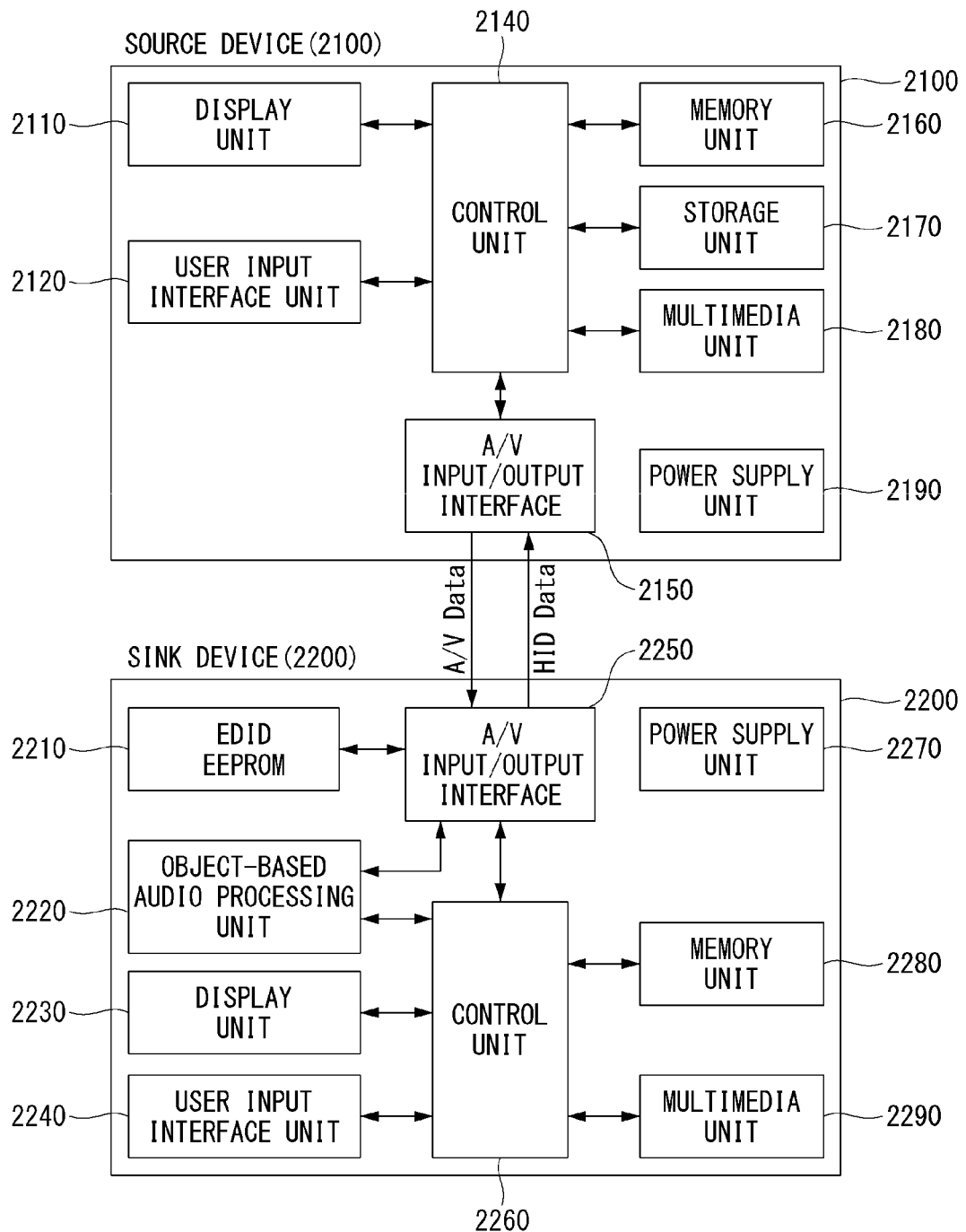

[Fig. 3]

| Address | No. Bytes | Description |
|---|---|---|
| 00h ~ 07h | 8 | HEADER INFORMATION<br>FIXED TO 00 FF FF FF FF FF FF 00 |
| 08h ~ 11h | 10 | IDENTIFYING VENDOR/PRODUCT. MANUFACTURER, PRODUCT CODE, SERIAL NUMBER, AND MANUFACTURING DATE |
| 12h ~ 13h | 2 | EDID STRUCTURE VERSION/REVISION |
| 14h ~ 18h | 5 | Basic Display Parameters/Features. DEFINING VIDEO INPUT (ANALOG OR DIGITAL), Max. Horizontal Image Size, Max. Vertical Image Size, Display Transfer Characteristic(Gamma), Feature Support(STANDBY, SUSPEND, DISPLAY TYPE, STANDARD DEFAULT COLOR SPACE (SRGB), WHETHER TO SUPPORT PREFERRED TIMING MODE, ETC.) |
| 19h ~ 22h | 10 | Color Characteristics. INFORMATION ASSOCIATED WITH COLOR AND WHITE POINT. EXPRESSED BY XY COORDINATES OF RED, GREEN, BLUE, AND WHITE ON COLOR SPACE |
| 23h ~ 25h | 3 | Established Timings. DESCRIBING TIMING MODE COMMONLY WIDELY USED |
| 26h ~ 35h | 16 | Standard Timings. 8 STANDARD TIMING DESCRIPTORS ARE DESCRIBED AND RANGE OF HORIZONTAL ACTIVE PIXEL, IMAGE ASPECT RATIO, AND REFRESH RATE (60 TO 123 HZ) INFORMATION ARE INCLUDED IN ONE DESCRIPTOR. TIMING NOT INCLUDED IN ESTABLISHED TIMING IS DESCRIBED BASED ON VESA DMT STANDARD OR TIMING INFORMATION CALCULATED BY GTF IS DESCRIBED |
| 36h ~ 7Dh | 72 | Detailed Timing Descriptors. DETAILED TIMING INFORMATION REGARDING RESOLUTION SUPPORTED BY DISPLAY IS DESCRIBED AND FOUR DESCRIPTORS EXIST FIRST DESCRIPTOR IS PREFERRED DETAILED TIMING SECOND DESCRIPTOR REPRESENTS SECONDARY DETAILED TIMING OR MONITOR ADDITIONAL INFORMATION (SERIAL NUMBER, RANGE LIMITS, AND NAME), AND TWO REMAINING DESCRIPTORS INCLUDE MONITOR ADDITIONAL INFORMATION. MONITOR RANGE LIMIT AND NAME NEED TO BE PARTICULARLY DESCRIBED |
| 7Eh | 1 | Extension Flag. REPRESENT THE NUMBER OF ADDED EDID EXTENSION BLOCKS |
| 7Fh | 1 | Checksum. |

[Fig. 4]
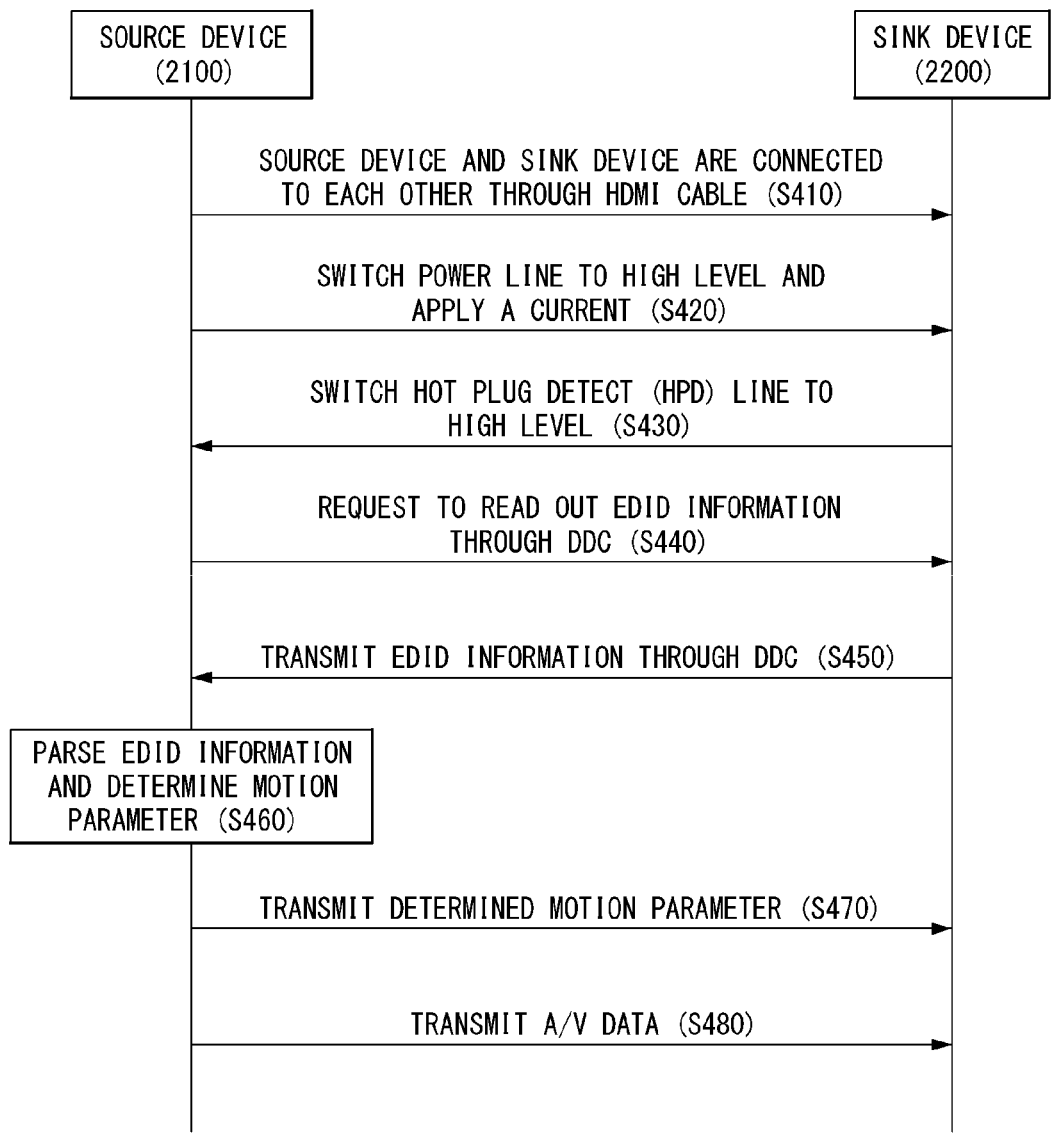

[Fig. 5]
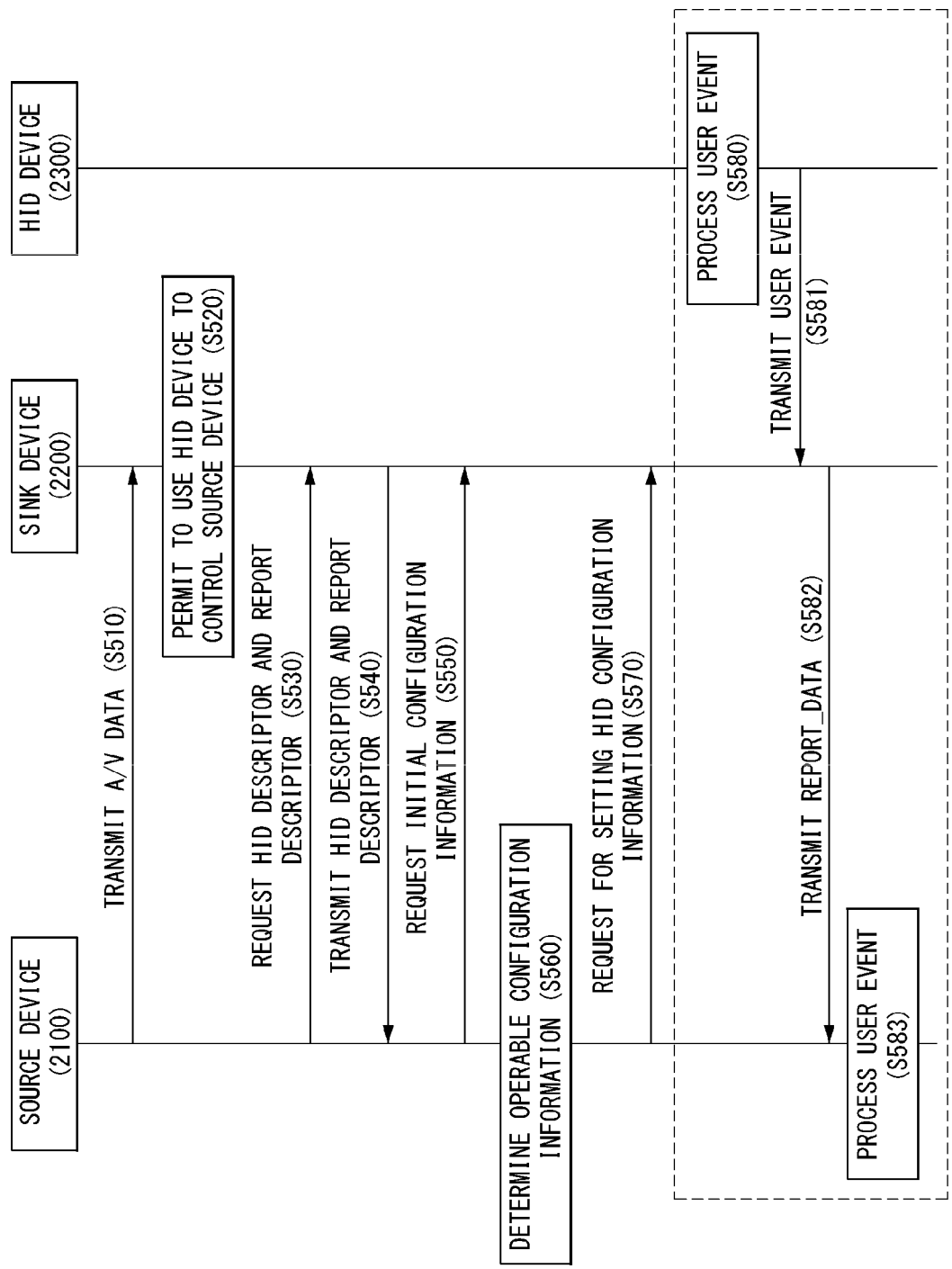

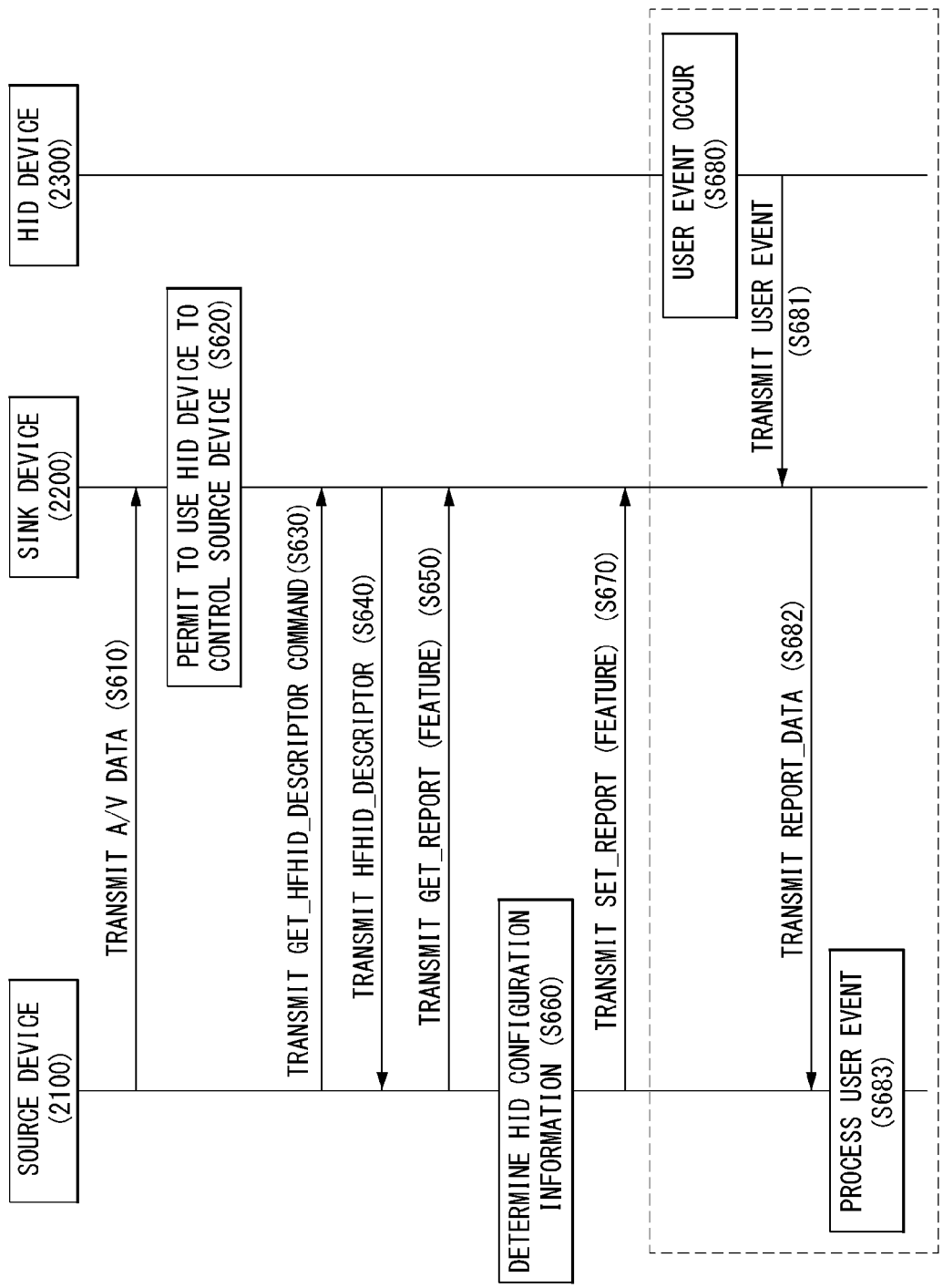
[Fig. 6]

| Header Byte # | 7 | 6 | 5 | 4 | 3 | 2 | 1 | 0 | Description |
|---|---|---|---|---|---|---|---|---|---|
| HB0 | Packet Type | | | | | | | | Type of Packet |
| HB1 | 0 | 0 | 0 | 0 | 0 | RT | | TP | Bit 0 : Indicate type of pipe defined in HID Class Spec. If set to 0, indicates Control pipe, otherwise indicates Interrupt pipe.<br>Bit 2~1 : Indicate Report Type (RT).<br>00: Reserved, 01: INPUT Report, 10: OUTPUT Report, 11: FEATURE Report. |
| HB2~HB3 | Length | | | | | | | | Data Length |

(b)

| Data Byte # | 7 | 6 | 5 | 4 | 3 | 2 | 1 | 0 |
|---|---|---|---|---|---|---|---|---|
| DB0 | Packet Payload | | | | | | | |
| DB 1 | ... | | | | | | | |
| DB (L-1) | Packet Payload | | | | | | | |

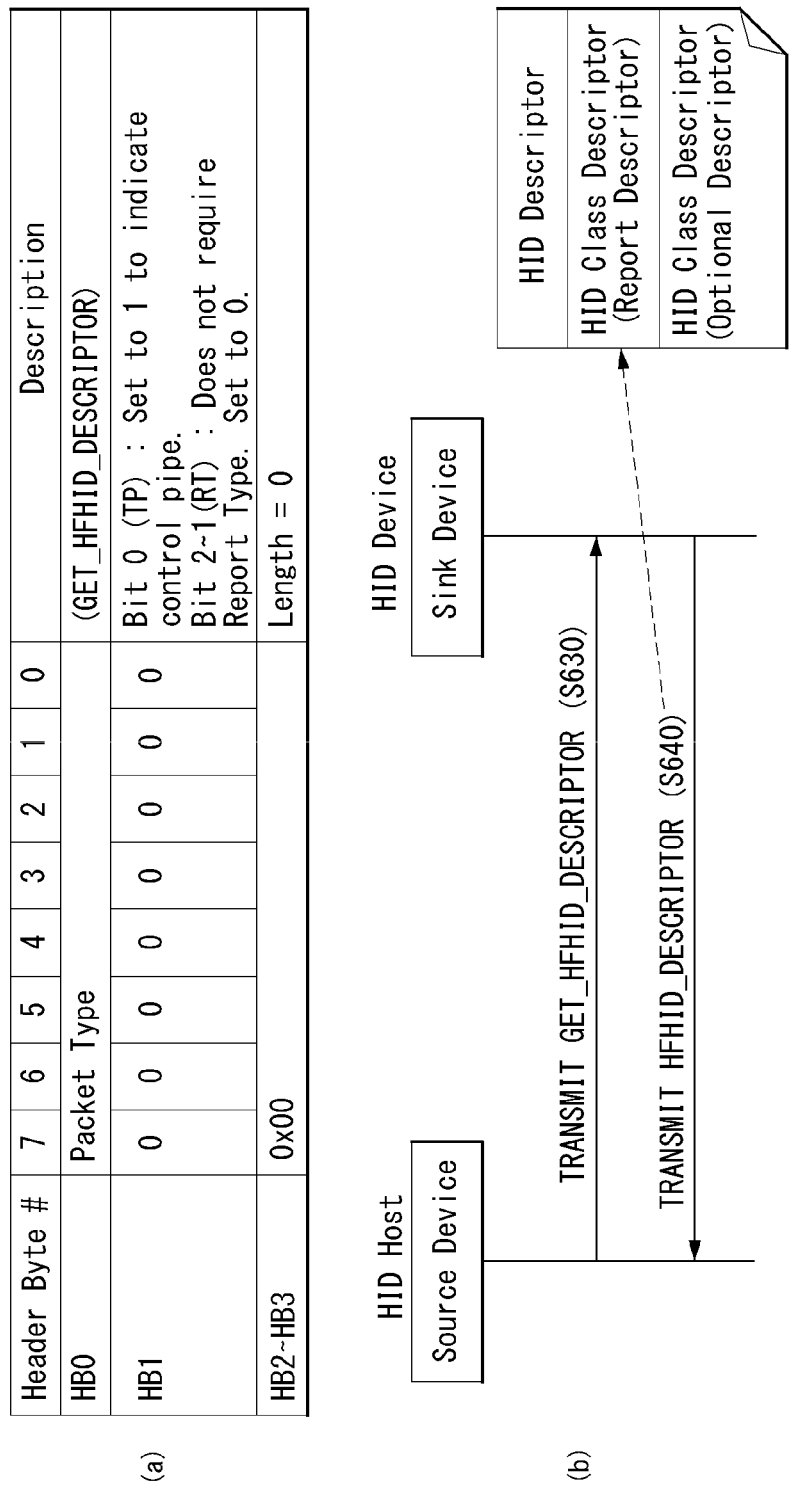

[Fig. 9]

| Header Byte # | 7 | 6 | 5 | 4 | 3 | 2 | 1 | 0 | Description |
|---|---|---|---|---|---|---|---|---|---|
| HB0 | Packet Type | | | | | | | | (HFHID_DESCRIPTOR) |
| HB1 | 0 | 0 | 0 | 0 | 0 | 0 | 0 | 0 | Bit 0 (TP) : Set to 1 to indicate control pipe.<br>Bit 2~1 (RT) : Does not require Report Type. Set to 0. |
| HB2~HB3 | Length(L) | | | | | | | | Length = L |

[Fig. 10]

| Data Byte # | 7 | 6 | 5 | 4 | 3 | 2 | 1 | 0 | Description |
|---|---|---|---|---|---|---|---|---|---|
| DB0 | bcdHID | | | | | | | | Numeric expression identifying the HID Class Specification |
| DB1 | bCountryCode | | | | | | | | Numeric expression identifying country code of the localized hardware |
| DB2 | bNumDescriptors | | | | | | | | Numeric expression specifying the number of class descriptors |
| DB3 | bDescriptorType | | | | | | | | Type of Report Descriptor |
| DB4 ~ DB5 | wDescriptorLength (L1) | | | | | | | | Total size of Report descriptor |
| DB6 | Report Descriptor | | | | | | | | Report Descriptor data |
| ... | ... | | | | | | | | |
| DB (L1+5) | Report Descriptor | | | | | | | | |
| DB (L1+6) | bDescriptorType | | | | | | | | Type of optional descriptor (e.g. physical descriptor) |
| DB (L1+7) ~ DB (L1+8) | wDescriptorLength (L2) | | | | | | | | Total size of optional descriptor |
| DB (L1+9) | Optional Descriptor | | | | | | | | Optional Descriptor data |
| ... | ... | | | | | | | | |
| DB (L1+L2+8) | Optional Descriptor | | | | | | | | |

| Header Byte # | 7 | 6 | 5 | 4 | 3 | 2 | 1 | 0 | Description |
|---|---|---|---|---|---|---|---|---|---|
| HB0 | Packet Type | | | | | | | | (GET_REPORT) |
| HB1 | 0 | 0 | 0 | 0 | 0 | RT | | 0 | Bit 0 (TP) : Set to 1 to indicate control pipe.<br>Bit 2~1(RT) : 00: Reserved, 01: INPUT Report, 10: OUTPUT Report, 11: FEATURE Report. |
| HB2~HB3 | 0x01 | | | | | | | | Length = 1 |

(b)

| Data Byte # | 7 | 6 | 5 | 4 | 3 | 2 | 1 | 0 | Description |
|---|---|---|---|---|---|---|---|---|---|
| DB0 | Report ID | | | | | | | | Report ID |

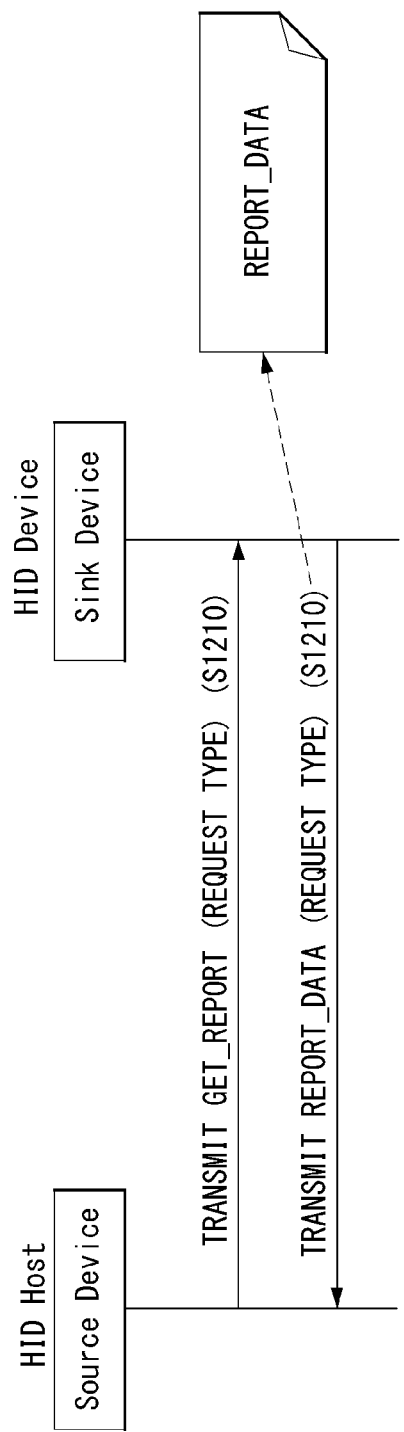
[Fig. 12]

| Header Byte # | 7 | 6 | 5 | 4 | 3 | 2 | 1 | 0 | Description |
|---|---|---|---|---|---|---|---|---|---|
| HB0 | Packet Type | | | | | | | | HFHID_DESCRIPTOR) |
| HB1 | 0 | 0 | 0 | 0 | 0 | RT | | TP | Bit 0 : Indicate type of pipe defined in HID Class Spec. If set to 0, indicates Control pipe, otherwise indicates Interrupt pipe. Bit 2~1(RT) : 00: Reserved, 01: INPUT Report, 10: OUTPUT Report, 11: FEATURE Report. |
| HB2~HB3 | Length | | | | | | | | Length = L |

(b)

| Data Byte # | 7 | 6 | 5 | 4 | 3 | 2 | 1 | 0 | Description |
|---|---|---|---|---|---|---|---|---|---|
| DB0 | Report ID | | | | | | | | Exist If the Report ID is declared in the report descriptor for the specified Report Type. |
| DB 1 | Report Data | | | | | | | | Report data as described in USB HID, Section 8.2 |
| DB (L-1) | | | | | | | | | |

| Header Byte # | 7 | 6 | 5 | 4 | 3 | 2 | 1 | 0 | Description |
|---|---|---|---|---|---|---|---|---|---|
| HB0 | Packet Type | | | | | | | | (SET_REPORT) |
| HB1 | 0 | 0 | 0 | 0 | 0 | RT | | 0 | Bit 0 (TP) : Set to 1 to indicate control pipe.<br>Bit 2~1 (RT) : 00: Reserved, 01: INPUT Report, 10: OUTPUT Report, 11: FEATURE Report. |
| HB2~HB3 | Length | | | | | | | | Data Length = L |

(b)

| Data Byte # | 7 | 6 | 5 | 4 | 3 | 2 | 1 | 0 | Description |
|---|---|---|---|---|---|---|---|---|---|
| DB0 | Report ID | | | | | | | | Exist If the Report ID is declared in the report descriptor for the specified Report Type. |
| DB 1 | Report Data | | | | | | | | Report data as described in USB HID, Section 8.2 |
| DB (L-1) | | | | | | | | | |

[Fig. 15]

| 7 | 6 | 5 | 4 | 3 | 2 | 1 | 0 |
|---|---|---|---|---|---|---|---|
| Device Mode (1511) | | | | Contact Count Max. (1510) | | | |
| Contact Count (1520) | | | | | | | |
| Contact Identifier (1521) | | | | | | | |
| X (1522) | | | | | | | |
| Y (1523) | | | | | | | |
| Channel Down | Channel Up | Voice Command | Selection Back | Quit | Closed Caption | Mute | Power |
| Num 1 | Num 0 | Color Button (Yellow) | Color Button (Blue) | Color Button (Green) | Color Button (Red) | Volume Down | Volume Up |
| Num 9 | Num 8 | Num 7 | Num 6 | Num 5 | Num 4 | Num 3 | Num 2 |

| | Name | bits | Description |
|---|---|---|---|
| 1510 | Contact Count Max | 4 bits | MAXIMUM NUMBER OF CONCURRENT CONTACTS THAT DIGITIZER CAN DETECT |
| 1511 | Device Mode | 4 bits | DEVICE INPUT MODE<br>Mode 0 (0) Represent reporting as a mouse. When both keyboard and mouse are touch-based, the device must support Device Mode usage that defaults to Mouse. The Touch and Touch Keyboard functions are not supported in this mode.<br>Mode 1 (1):Represent reporting as a single-input device such as a HID single touch or pen device.<br>Mode 2 (2):Represent reporting as a multi-input device such as a HID touch device supporting contact ID and Contact Count Max. |

(b)

| | Name | bits | Description |
|---|---|---|---|
| 1520 | Contact Count | 8 bits | The current number of contacts the digitizer detects and is reporting |
| 1521 | Contact Identifier | 8 bits | An identifier associated with a contact |
| 1522 | X | 16 bits | A linear translation in the X direction |
| 1523 | Y | 16 bits | A linear translation in the Y direction |

[Fig. 17]

| Name | bits | Description |
|---|---|---|
| Power | 1 bit | Power On/Off |
| Number pad with ten digits | 10 bits | 1 through 9 and 0 |
| Channel up and down | 2 bits | Channel up and down |
| Volume up and down | 2 bits | Volume up and down |
| Mute | 1 bit | Audio Mute. |
| Closed Caption | 1 bit | Enable closed caption display. |
| Quit | 1 bit | Exits the current mode. |
| Selection Back | 1 bit | Returns to the last selected channel or mode. |
| Color Button (Red, Blue, Yellow, Green) | 4 bits | Color Button (Red, Blue, Yellow, Green) |
| Voice Command | 1 bit | Initiates listening for Voice Command. |

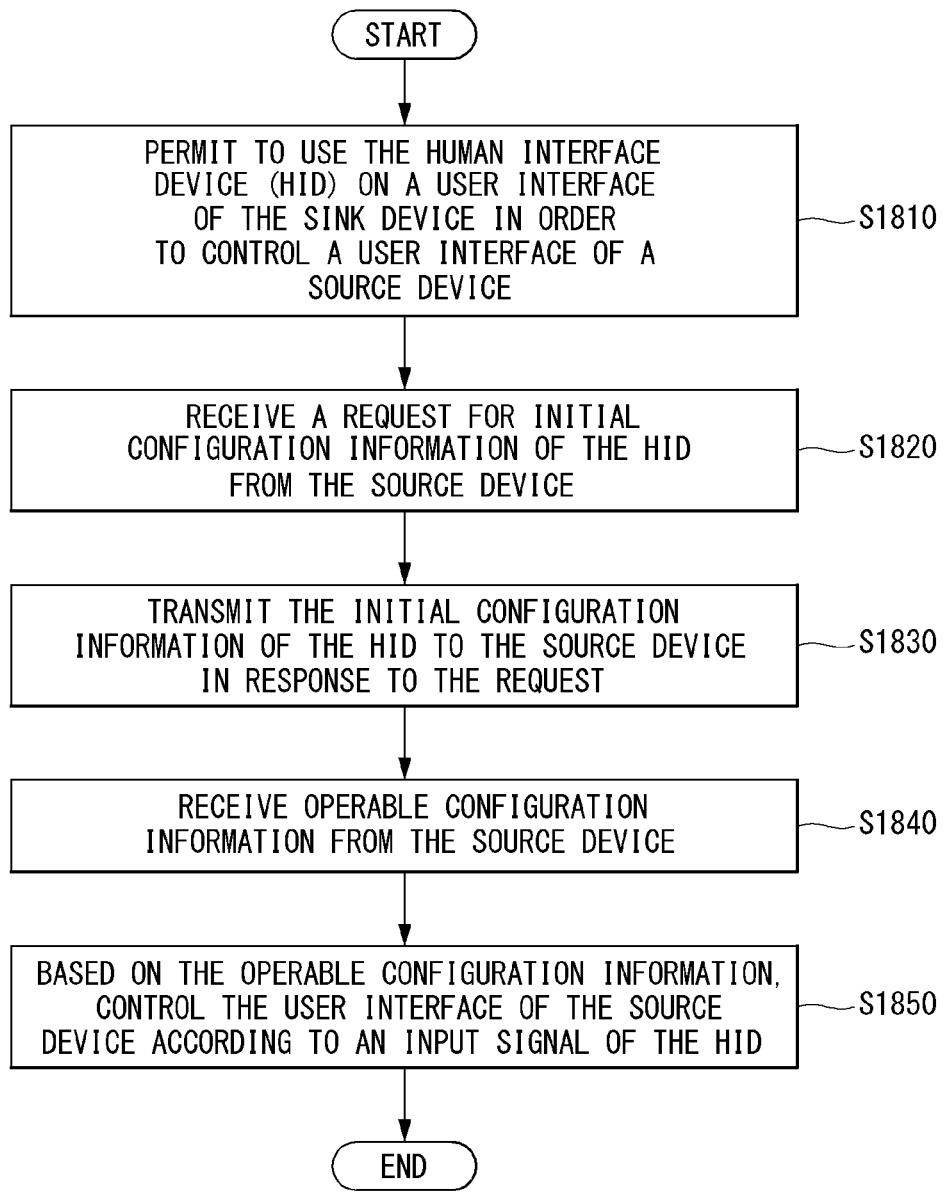

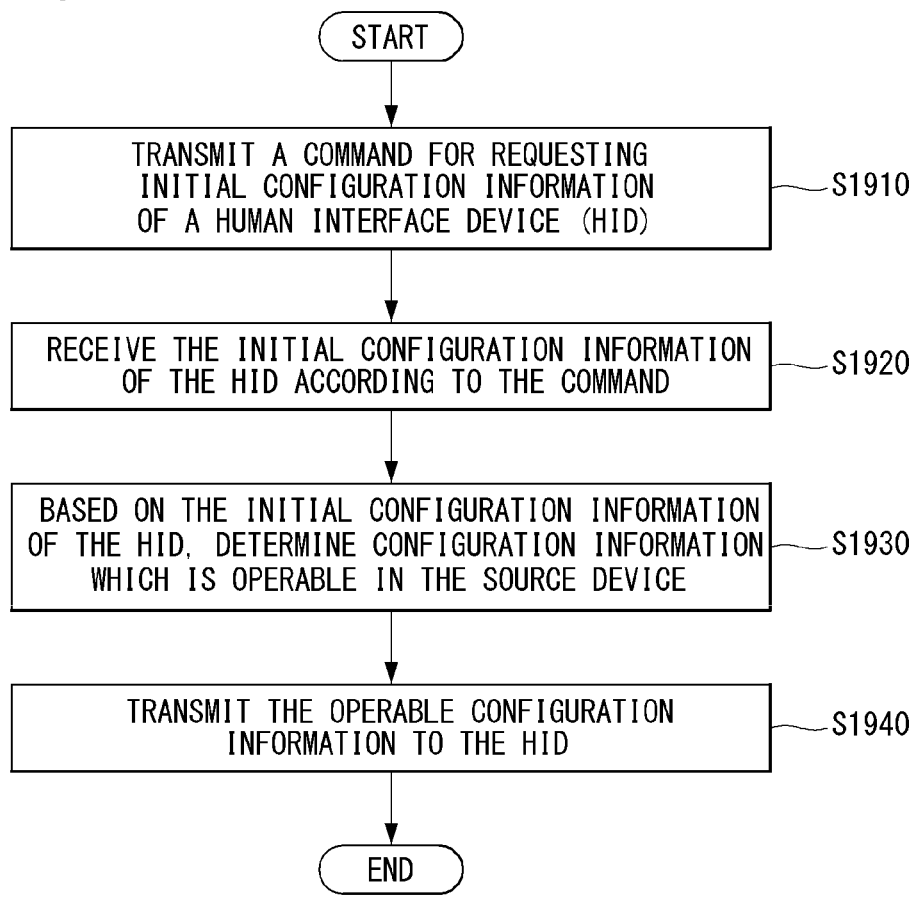
[Fig. 19]

METHOD AND APPARATUS FOR PROCESSING HUMAN INTERFACE DEVICE (HID)-BASED DATA USING HIGH-SPEED INTERFACE

CROSS REFERENCE TO RELATED APPLICATIONS

This application is the National Phase of PCT International Application No. PCT/KR2016/010428, filed on Sep. 19, 2016, which claims priority under 35 U.S.C. 119(e) to U.S. Provisional Application No. 62/219,174, filed on Sep. 16, 2015, all of which are hereby expressly incorporated by reference into the present application.

TECHNICAL FIELD

The present invention relates to a method and apparatus for transmitting and receiving human interface device (HID)-based data using High Definition Multimedia Interface (HDMI). Particularly, the present invention relates to a method and apparatus for transmitting touch data and/or human interface device (HID) data input from a sink device to a source device through a high-speed interface.

BACKGROUND ART

An HDMI is an interface/standard that develops a Digital Visual Interface (DVI) which is an interface standard of personal computers and displays for a use of AV electronic products. Since the HDMI transmits video/audio from a player to a display device without compressing it, there is very little latency between a source device and a sink device. And the HDMI has high format compatibility since the HDMI does not require separate decoder chip or software.

As UHD TVs are spreading, UHD contents are now being distributed in various forms of storage media and through various services to provide the users with a vivid sense of realism and immersion through UHD TVs. The user can enjoy UHD contents in uncompressed video by connecting an external source device such as a UHD TV, set-top box, and Blue-ray disc player via a wired video interface such as HDMI, DisplayPort, and the like.

The conventional high-speed interface transports video and audio data from a source device that provides contents to a sink device that displays contents. However, according to the evolution of a sink device like a TV, there is the need to forward data in the reverse direction to the direction in which video and audio data are forwarded.

The sink device that is available to connect a Human Interface Device (HID; e.g., a keyboard, a mouse, etc.) as well as a touch function utilizes the Universal Serial Bus (USB) interface for forwarding the data received from touch data or a Human Interface Device (HID) to the source device. That is, independent of a high-speed interface for forwarding video and audio from the source device to the sink device, a separate USB interface is required for forwarding touch data or HID input data from the source device to the sink device. This acts not only as a factor for increasing hardware complexity and price but a user is unable to use it intuitively, and accordingly, causes an inconvenience in use.

Accordingly, a method is required for transmitting touch data and/or HID data input from a sink device through a high-speed interface to a source device.

DISCLOSURE

Technical Problem

The present invention is to provide a method for transmitting touch data and/or HID data input from a sink device to a source device through a high-speed interface.

In addition, the present invention is to provide a method for identifying HID characteristics of a sink device (HID device) and a structure of HID data transmitted by the sink device.

In addition, the present invention is to provide a method for reading device configuration data when a source device discovers data in relation to a device configuration (e.g., the number of points touchable at the same time, device mode, etc.) of a sink device by interpreting a report descriptor.

In addition, the present invention is to provide a method for a source device to match a device configuration value of a sink device and a device configuration value of the source device, and forward the matched value to the sink device.

In addition, the present invention is to provide a method for a sink device to transmit touch or HID device data input from a user to a source device.

In addition, the present invention is to define a packet for exchanging data between a source device and a sink device for applying the packet to an HDMI interface.

Technical Solution

The present invention provides a method for transmitting touch data and/or HID data input from a sink device through a high-speed interface to a source device.

In addition, the present invention provides a method for defining a HID descriptor and a report descriptor to identify HID characteristics and a structure of HID data.

In addition, the present invention provides a method for defining GET_REPORT command for a source device to read device configuration data of a sink device.

In addition, the present invention provides a method for defining SET_REPORT command for a source device to match a device configuration value of a sink device and a device configuration value of the source device, and forward the matched value to the sink device.

In addition, the present invention provides a method for defining REPORT_DATA message for transmitting touch data and/or HID data.

In addition, the present invention defines a packet type of GET_HFHID_DESCRIPTOR, GET_REPORT, SET_REPORT, HFHID_DESCRIPTOR and REPORT_DATA to transmit and receive data between a source device and a sink device for applying it to an HDMI interface.

Technical Effects

The technique of the conventional high-speed wired interface has been evolved mainly for video and audio data, and to transmit ultra-high resolution video and high quality audio. However, according to the evolution of a display device like a TV, there is the need to forward data in the reverse direction to the direction in which video and audio data are forwarded. The display device that is available to connect a Human Interface Device (HID; e.g., a keyboard, a mouse, etc.) as well as a touch function may forward touch data or data received from the HID to a contents providing device like a set-top box through a high-speed multimedia wired interface, and accordingly, may provide a convenience in use and an improved use experience.

DESCRIPTION OF DRAWINGS

FIG. 1 illustrates an HDMI system and data transmission and reception channels included in the HDMI system as an embodiment to which the present invention is applied.

FIG. 2 illustrates a source device and a sink device in a HDMI system as an embodiment to which the present invention is applied.

FIG. 3 is a diagram illustrating an Extended Display Identification Data (EDID) structure as an embodiment to which the present invention is applied.

FIG. 4 is a flowchart illustrating a method for transmitting and receiving AN data through HDMI as an embodiment to which the present invention is applied.

FIG. 5 is a flowchart illustrating a method for transmitting and receiving Human Interface Device (HID) data through HDMI as an embodiment to which the present invention is applied.

FIG. 6 is a flowchart illustrating a method for transmitting and receiving HID data using HDMI Forum Human Interface Device (HFHID) command as an embodiment to which the present invention is applied.

FIG. 7 illustrates a basic message format for transmitting Human Interface Device (HID) data through HDMI as an embodiment to which the present invention is applied.

FIG. 8 illustrates a message format of GET_HFHID_DESCRIPTOR command for obtaining HID descriptor and a schematic transmission procedure as an embodiment to which the present invention is applied.

FIGS. 9 and 10 illustrate a message format of HFHID_DESCRIPTOR which is a response message to the GET_HFHID_DESCRIPTOR command as embodiments to which the present invention is applied.

FIGS. 11 and 12 illustrate a message format of GET_REPORT command for obtaining report data and a schematic transmission procedure as embodiments to which the present invention is applied.

FIG. 13 illustrates a message format of a response message REPORT_DATA for GET_REPORT command as an embodiment to which the present invention is applied.

FIG. 14 illustrates a message format of SET_REPORT for transmitting report data in relation to a specified report ID as an embodiment to which the present invention is applied.

FIGS. 15 to 17 illustrate a detailed structure of a response message REPORT_DATA for GET_REPORT command as embodiments to which the present invention is applied.

FIG. 18 illustrates a flowchart for processing data of a Human Interface Device (HID) on a high-speed interface by a sink device as an embodiment to which the present invention is applied.

FIG. 19 illustrates a flowchart for processing data of a Human Interface Device (HID) on a high-speed interface by a source device as an embodiment to which the present invention is applied.

BEST MODE FOR INVENTION

The present invention provides a method for processing Human Interface Device (HID) data on a high-speed interface performed by a sink device. In here, the method includes permitting a use of a Human Interface Device (HID) on a user interface of the sink device to control a user interface of a source device; receiving a request for initial configuration information of the HID from the source device; in response to the request, transmitting the initial configuration information of the HID to the source device; receiving operable configuration information from the source device, and the operable configuration information indicates configuration information of the source device which is matched to the initial configuration information of the HID; and controlling the user interface of the source device according to an input signal of the HID based on the operable configuration information.

In addition, in the present invention, the input signal of the HID is transmitted to the source device through report data, and the report data includes device configuration information, digitizer information and consumer device information.

In addition, in the present invention, the device configuration information includes a maximum number of simultaneous touches detectable by a digitizer and an input mode of the HID and the input mode of the HID includes at least one of a first mode indicating a mouse, a second mode indicating a single input touch or a third mode indicating a multi input touch.

In addition, in the present invention, the digitizer information includes at least one of a touch number currently detected, a touch identifier, linear translation information in the X direction or linear translation information in the Y direction.

In addition, in the present invention, before receiving the request for the initial configuration information of the HID, the method further includes receiving a request for HID Descriptor and Report Descriptor from the source device and transmitting the HID Descriptor and the Report Descriptor to the source device. The HID Descriptor indicates header information of the HID data and the Report Descriptor indicates payload information of the HID data.

In addition, in the present invention, the header information of the HID data includes pipe type information and report type information, the pipe type information indicates whether the pipe type is a synchronous report or asynchronous report, and the report type information includes at least one of a first type indicating low-latency data provided from the HID, a second type indicating low-latency data provided from an HID host or a third type indicating application-specific data.

In addition, the present invention provides a sink device for processing a Human Interface Device (HID) on a high-speed interface including a control unit configured to permit a use of a Human Interface Device (HID) on a user interface of the sink device to control a user interface of a source device; an A/V input/output interface configured to receive a request for initial configuration information of the HID from the source device, in response to the request transmit the initial configuration information of the HID to the source device, and receive operable configuration information from the source device. The control unit configured to control the user interface of the source device according to an input signal of the HID based on the operable configuration information, and the operable configuration information indicates configuration information of the source device which is matched to the initial configuration information of the HID.

In addition, in the present invention, before receiving a request for the initial configuration information of the HID, the control unit is configured to receive a request for HID Descriptor and Report Descriptor from the source device, and transmit the HID Descriptor and the Report Descriptor to the source device. The HID Descriptor indicates header information of the HID data and the Report Descriptor indicates payload information of the HID data.

In addition, the present invention provides a method for processing a Human Interface Device (HID) on a high-speed interface performed by a source device including transmitting a command for requesting initial configuration information of a Human Interface Device (HID); receiving the initial configuration information of the HID according to the command; determining configuration information which is operable in the source device based on the initial configuration information of the HID, the operable configuration information indicates configuration information of the source device which is matched to the initial configuration information of the HID; transmitting the operable configuration information to the HID, and a user interface of the source device is controlled by the HID based on the operable configuration information.

In addition, the present invention provides a source device for processing a Human Interface Device (HID) on a high-speed interface including an A/V input/output interface configured to transmit a command for requesting initial configuration information of a Human Interface Device (HID), and to receive the initial configuration information of the HID according to the command; a control unit configured to determine configuration information which is operable in the source device based on the initial configuration information of the HID, the operable configuration information indicates configuration information of the source device which is matched to the initial configuration information of the HID, and a user interface of the source device is controlled by the HID based on the operable configuration information.

Mode for Invention

Hereinafter, exemplary elements and operations in accordance with embodiments of the present invention are described with reference to the accompanying drawings. It is however to be noted that the elements and operations of the present invention described with reference to the drawings are provided as only embodiments and the technical spirit and kernel configuration and operation of the present invention are not limited thereto.

In addition, terms used in this specification are common terms that are now widely used, but in special cases, terms randomly selected by the applicant are used. In such a case, the meaning of a corresponding term is clearly described in the detailed description of a corresponding part. Accordingly, it is to be noted that the present invention should not be construed as being based on only the name of a term used in a corresponding description of this specification and that the present invention should be construed by checking even the meaning of a corresponding term.

Furthermore, terms used in this specification are common terms selected to describe the invention, but may be replaced with other terms for more appropriate analysis if such terms having similar meanings are present. For example, a signal, data, a sample, a picture, a frame, and a block may be properly replaced and interpreted in each coding process.

FIG. 1 illustrates an HDMI system and data transmission and reception channels included in the HDMI system as an embodiment to which the present invention is applied.

Devices that transmit and receive at least one of video/audio/control data, touch data or Human Interface Device (HID) data using High Definition Multimedia Interface (HDMI) may be called collectively an HDMI system, and the HDMI system may include a source device 1010, a sink device 1020, and an HDMI cable. In the HDMI system, a device that transmits video/audio data through HDMI corresponds to the source device 1010, a device that receives video/audio data through HDMI corresponds to the sink device 1020, and an HDMI cable is provided to support data transmission and reception by connecting the two devices.

Here, the present invention proposes a method for transmitting touch data and/or HID data input from the sink device to the source device through the HDMI cable.

As shown in FIG. 1, the HDMI cables and the connectors may perform pairing of four channels that provides a Transition Minimized Differential Signaling (TMDS) data channel and a TMDS clock channel. The TMDS data channels may be used for forwarding video data, audio data and auxiliary data.

Additionally, the HDMI system provides a VESA (Video Electronics Standards Association) DDC (Display Data Channel). The DDC is used for configuration of one source device and one sink device and exchange of status information between them. A CEC protocol can provide a high-level control function among various audio-visual products in a user environment and may be used optionally. In addition, an optional HEAC (HDMI Ethernet and Audio Return Channel) may provide Ethernet-compatible data networking among an ARC (Audio Return Channel) and connected devices in the opposite direction from a TMDS.

Video data, audio data and supplementary data may be transmitted and received through three TDMS data channels. Commonly, a TMDS clock runs a video pixel rate, and is transmitted through a TMDS clock channel. The TMDS clock may be used as a reference frequency for data recovery in three TMDS data channels in an HDMI receiver. In a source device, the data of 8 bits per TMDS data channel may be transformed into a sequence of 10 bits of which transition is minimized, which is DC balanced, and transmitted in serial manner with a rate of 10 bits per TMDS clock period.

In order to transmit audio data and supplementary data through the TMDS channel, the HDMI uses a packet structure. In order to attain high reliability for audio data and control data, data may be transmitted in word of 10 bits which is generated by using a BCH error correction code and an error reduction coding.

The source device may identify configuration information and available functions of the sink device by reading out Enhanced Extended Display Identification Data (E-EDID) of the sink device in the Display Data Channel (DDC). In the present disclosure, the E-EDID may be called EDID information or EDID.

For example, the source device may identify whether to support object-based audio process function of the sink device and the property information thereof by reading out Extended Display Identification Data (EDID). Here, the Extended Display Identification Data (EDID) may include object-based audio process information, and the object-based audio process information may include at least one of capability information indicating whether to process object-based audio and property information required for processing the object-based audio.

Meanwhile, a utility line may be used for an optional extension function such as HEAC.

FIG. 2 illustrates a source device and a sink device in a HDMI system as an embodiment to which the present invention is applied.

In the HDMI system, the device that transmits video/audio data through HDMI corresponds to the source device 2100, and the device that receives video/audio data through HDMI corresponds to the sink device 2200.

In the present invention, the source device that transmits contents takes in charge of a Human Interface Device (HID)

host and the sink device that displays contents performs the roles of both of the HID host and the HID device. The sink device performs the role of HID device when transmitting and receiving data with the source device, and performs the role of the HID host when receiving HID or touch data.

The source device 2100 includes at least one of a display unit 2110, a user input interface unit 2120, a control unit 2140, an A/V (Audio/Video) input/output interface 2150, a memory unit 2160, a storage unit 2170, a multimedia unit 2180, or a power supply unit 2190.

The sink device 2200 includes at least one of an EDID EEPROM 2210, an object-based audio processing unit 2220, a display unit 2230, a user input interface unit 2240, an A/V input/output interface 2250, a control unit 2260, a power supply unit 2270, a memory unit 2280, or a multimedia unit 2290.

Here, the A/V input/output interfaces 2150 and 2250 may perform the roles of HDMI transmitter/receiver. Hereinafter, the description about units performing the same operation will not be repeated.

The source device 2100 represents a physical device transmitting or streaming contents stored in the storage unit to the sink device 2200. The source device 2100 may send a request message to the sink device or may receive and process a request message from the sink device. In addition, the source device 2100 may provide a UI through which a response message that the sink device 2200 transmits with respect to a transmitted request message is processed and forwarded to a user, and in the case that the source device 2100 includes the display unit 2110, the source device 2100 may provide the UI as a display.

The sink device 2200 may receive contents from the source device 2100, and may transmit a request message to the source device 2100, or may transmit a response message by processing a message received from the source device 2100. The sink device 2200 may also provide a UI through which a response message received from the source device 2100 is processed and delivered to a user, and in the case that the sink device 2200 includes the display unit 2230, the sink device 2200 may provide the UI as a display.

The source device 2100 and the sink device 2200 may include the user input interface units 2120 and 2240 that receive a user's action or input, and as an embodiment, the user input interfaces 2120 and 2240 may correspond to a remote controller, a voice reception/recognition device, or a touch input sensing/receiving device.

The memory units 2160 and 2280 represent a volatile physical device in which various types of data are stored temporarily.

The storage unit 2170 represents a nonvolatile physical device in which various types of data may be stored.

The EDID EEPROM 2210 represents an EEPROM that stores EDID information.

All of the aforementioned memory unit, the storage unit, and the EDID EEPROM perform the function of storing data, which may be called collectively a memory unit.

The display units 2110 and 2230 display the data received through HDMI, the data stored in a content storage or the UI on a screen according to the control of the control unit.

The multimedia units 2180 and 2290 play various types of multimedia contents. The multimedia units 2180 and 2290 may be implemented independently from the control units 2140 and 2260 or implemented as one physical component together with the control unit.

The power supply units 2190 and 2270 supply power required for operating a source device, sink device, and sub-units belonging to the source and sink devices.

The A/V input/output interface 2150 is a unit that is installed in the source device 2100 and transmits and receives data through HDMI. The A/V input/output interface 2150 transmits and receives data including a message such as a command, a request, an action, a response, and so on as well as audio/video data.

The A/V input/output interface 2250 is a unit that is installed in the sink device 2200 and transmits and receives data through HDMI. The A/V input/output interface 2250 transmits and receives data including a message such as a command, a request, an action, a response, and so on as well as audio/video data.

Meanwhile, a video encoding unit (not shown) may compress video data that is going to be transmitted through the A/V input/output interface 2150, and a video encoding unit (not shown) may perform decompression of the compressed video data which is received through the A/V input/output interface 2250.

Hereinafter, channels, data structures and functions provided by HDMI will be described in more detail.

As described above, an HDMI system provides a Display Data Channel (DDC) which is a protocol standard for transmitting digital information between a monitor and a computer graphic adapter defined in Video Electronics Standard Association (VESA). HDMI devices may transmit display mode information supportable in a monitor to a graphic adapter through the DDC, and in accordance with it, the graphic adapter may transmit an image to the monitor.

Hereinafter, the Extended Display Identification Data (EDID) provided through the DDC is described.

FIG. 3 is a diagram illustrating an Extended Display Identification Data (EDID) structure as an embodiment to which the present invention is applied.

The Extended Display Identification Data (EDID) is a data structure containing various types of information about the display device defined in the VESA and may be transmitted to the source device through a DDC channel or read out by the source device. In the case of the EDID, the data structure of version 1.3 has been used in an IT display device, a CE display device, and a video interface (HDMI).

FIG. 3 illustrates an overview of the information represented by the respective addresses in the EDID data structure.

FIG. 4 is a flowchart illustrating a method for transmitting and receiving AN data through HDMI as an embodiment to which the present invention is applied.

FIG. 4 illustrates an embodiment that HDMI devices transmit A/V data (at least one of audio data or video data) from a source device to a sink device.

First, a source device 2100 and a sink device 2200 are connected to each other through an HDMI cable (step, S410). When HDMI cable is connected, the source device 2100 switches the power line of 5V from low level to high level and applies a current (step, S420). Through this, the source device 2100 may operate the EEPROM in which EDID information of the sink device 2200 is stored and the related circuit. The sink device 2200 may switch the Hot Plug Detect (HPD) line from low to high level (step, S430), and inform the source device 2100 of the fact that the cable has been connected properly and the EDID information may be accessible as EDID-related circuit has been activated.

Afterwards, the source device 2100 may transmit an EDID information read out request to the sink device 2200 through DDC (step, S440). In response to the EDID read out request, the sink device 2200 may transmit the EDID information stored in the EEPROM through the DDC (step, S450). In the embodiment of the present invention, the EDID information may be transmitted as VSDB described above.

The sink device 2200 may parse the received EDID information and may determine a motion parameter of A/V data that is going to transmit to the sink device (step, S460), and may transmit the determined motion parameter in relation to the A/V data that is going to transmit to the source device 2100 (step, S470). In the embodiment of the present invention, the motion parameter may be transmitted as HF-VSIF.

Lastly, the source device 2100 may transmit the A/V data controlled by the determined motion parameter to the sink device 2200 (step, S480).

Aforementioned FIG. 4 illustrates a method for transmitting the A/V data. However, in the case that the sink device that may be interlinked with a Human Interface Device (HID) is unable to transmit HID data to the source device, the sink device is unable to control the source device by the HID. Accordingly, the present invention provides a method for transmitting touch data and/or HID data input from the sink device to the source device through an HDMI cable, and hereinafter, the embodiments will be described in detail.

FIG. 5 is a flowchart illustrating a method for transmitting and receiving Human Interface Device (HID) data through HDMI as an embodiment to which the present invention is applied.

First, a source device 2100 may transmit A/V data to a sink device 2200 (step, S510). Here, the source device 2100 may play the role of an HID host and the sink device 2200 may play the roles of an HID host and an HID device. Meanwhile, the HID device 2300 may be existed as a separate device. In the present disclosure, the HID device may be included in the sink device and/or may be a separate device.

In order to control a user interface of the source device 2100, the sink device 2200 may permit to use the HID device on a user interface of the sink device 2200 (step, S520).

In order to identify a property of the HID device connected to the sink device 2200 and the transmitted data structure, the source device 2100 may request an HID Descriptor and a Report Descriptor to the sink device 2200 (step, S530).

In response to the request, the sink device 2200 may transmit the HID Descriptor and the Report Descriptor to the source device 2100 (step, S540).

The source device 2100 may request Initial Configuration information of the HID device to the sink device 2200 (step, S550). Further, the source device 2100 may obtain or read the Initial Configuration information from the sink device 2200.

The source device 2100 may determine operable configuration information of the source device 2100 by comparing the initial configuration information of the sink device 2200 and configuration information of the source device 2100 (step, S560).

The source device 2100 may transmit a request for configuration information to the sink device 2200 in order to set the operable configuration information (step, S570).

A user may manipulate the HID device 2300 and may control the user interface of the source device 2100 displayed on the sink device 2200 (step, S580). In the present disclosure, the control of the HID device may be called a User Event Occurrence.

The HID device 2300 may transmit control signal or control data to the sink device 2200 through a third interface (e.g., IR, Bluetooth, Wi-Fi, etc.) (step, S581).

The sink device 2200 may transmit the control signal or the control data received from the HID device 2300 to the source device 2100 (step, S582). Here, the control signal or the control data may include REPORT_DATA, and the REPORT_DATA will be described with reference to FIG. 13, FIG. 15 to FIG. 17 in detail.

In the case that the source device 2100 receives the control signal or the control data from the sink device 2200, the source device 2100 may perform an operation (e.g., process a user event) according to the control signal or the control data (step, S583).

Here, whenever the user event of step S580 occurs, the steps S580 to S583 may be repeatedly performed.

FIG. 6 is a flowchart illustrating a method for transmitting and receiving HID data using HDMI Forum Human Interface Device (HFHID) command as an embodiment to which the present invention is applied.

First, a source device 2100 may transmit A/V data to a sink device 2200 (step, S610). Here, the source device 2100 may play the role of an HID host and the sink device 2200 may play the roles of an HID host and an HID device. Meanwhile, the HID device 2300 may be existed as a separate device. In the present disclosure, the HID device may be included in the sink device and/or may be a separate device.

In order to control a user interface of the source device 2100, the sink device 2200 may permit to use the HID device on a user interface of the sink device 2200 (step, S620).

In order to identify a property of the HID device connected to the sink device 2200 and transmitted data structure, the source device 2100 may transmit GET_HFHID_DESCRIPTOR command (step, S630). Here, the GET_HFHID_DESCRIPTOR command may mean a command for obtaining an HID Descriptor and a Report Descriptor from the sink device 2200.

In response to the GET_HFHID_DESCRIPTOR command, the sink device 2200 may transmit the HID Descriptor and the Report Descriptor to the source device 2100 through HFHID_DESCRIPTOR response message (step, S640).

In order to obtain initial configuration information of the HID device from the sink device 2200, the source device 2100 may transmit GET_REPORT message (step, S650). For example, the initial configuration information may include a request type and Report Data for a specific Report ID. In response to the GET_REPORT message, the sink device 2200 may transmit the request type and REPORT_DATA message including data for the specific Report ID to the source device 2100.

The source device 2100 may determine operable configuration information of the source device 2100 by comparing the initial configuration information of the sink device 2200 and configuration information of the source device 2100 (step, S660).

The source device 2100 may transmit SET_REPORT message to the sink device 2200 in order to set the operable configuration information (step, S670).

A user may manipulate the HID device 2300 and may control the user interface of the source device 2100 displayed (or ouput) on the sink device 2200 (step, S680).

The HID device 2300 may transmit control signal or control data to the sink device 2200 through a third interface (e.g., IR, Bluetooth, Wi-Fi, etc.) (step, S681).

The sink device 2200 may transmit the control signal or the control data received from the HID device 2300 to the source device 2100 (step, S682). Here, the control signal or the control data may include REPORT_DATA, and the REPORT_DATA will be described with reference to FIG. 13, FIG. 15 to FIG. 17 in detail.

In the case that the source device 2100 receives the control signal or the control data from the sink device 2200, the source device 2100 may perform an operation (e.g., process a user event) according to the control signal or the control data (step, S683).

Here, whenever the user event of step S680 occurs, the steps S680 to S683 may be repeatedly performed.

FIG. 7 illustrates a basic message format for transmitting Human Interface Device (HID) data through HDMI as an embodiment to which the present invention is applied.

First, the Human Interface Device (HID) message may include a Packet Header of 4 Byte size and a Packet Payload of L Byte size.

FIG. 7(*a*) illustrates a Packet Header of the Human Interface Device (HID) message and FIG. 7(*b*) illustrates a Packet Payload of the Human Interface Device (HID) message.

Referring to FIG. 7(*a*), among 4 bytes of the Packet Header of the Human Interface Device (HID) message, HB0 may include a packet type, HB1 may include a pipe type and a report type, and HB2 to HB3 may include a data length. In addition, referring to FIG. 7(*b*), DB0 to DB(L−1) may include a packet payload.

Here, 1 bit may be allocated to the pipe type, and when the value is 0, this may mean a control pipe, and when the value is 1, this may mean an interrupt pipe. 2 bits may be allocated to the report type, and 00 may set as a reserved region, 01 may set as an input report, 01 may set as an output report, and 11 may set as a feature report.

An HID packet may be carried by the control pipe or the interrupt pipe. The control pipe may be mentioned as asynchronous reports, and may be initialized by an HID host through SET_REPORT or GET_REPORT request.

The interrupt pipe may be mentioned as asynchronous reports, and may be used for carrying low-latency data generated from the HID host or the HID device without any separate request.

In addition, among the report types, INPUT Report provides low latency data from the HID device to the HID host. For example, the low-latency data may include position changes of mouse. The HID device is needed to transmit the INPUT Report only when a report change field is existed.

OUTPUT Report provides low latency data from the HID device to the HID host. For example, the HID host may use the OUTPUT Report in order to trigger force-feedback effect on an HID force-feedback gamepad device. The HID host is needed to transmit the OUTPUT Report using SET_REPORT request.

FEATURE Report may provide application-specific data or HID device configuration information. For example, the HID host may use the FEATURE Report for adjusting coordinate scaling parameters, for enabling HID device options and for determining a current device state.

The allocation of byte number and bit number corresponds to just an example in this embodiment and other embodiment, and the present invention is not limited thereto.

FIG. 8 illustrates a message format of GET_HFHID_DESCRIPTOR command for obtaining HID descriptor and a schematic transmission procedure as an embodiment to which the present invention is applied.

FIG. 8(*a*) illustrates a Packet Header of GET_HFHID_DESCRIPTOR command and FIG. 8(*b*) illustrates a transmission procedure of GET_HFHID_DESCRIPTOR command.

First, referring to FIG. 8(*b*), a source device may transmit the GET_HFHID_DESCRIPTOR command in order to identify a property of an HID device connected to a sink device and a data structure which is transmitted (step, S630). Further, in response to the GET_HFHID_DESCRIPTOR command, the sink device may transmit at least one of the HID Descriptor, the Report Descriptor or an Optional Descriptor to the source device through HFHID_DESCRIPTOR response message (step, S640).

The GET_HFHID_DESCRIPTOR command may mean a command for obtaining at least one of the HID Descriptor, the Report Descriptor or the Optional Descriptor from the sink device.

Referring to FIG. 8(*a*), the GET_HFHID_DESCRIPTOR command may include only a Packet Header of 4 byte size without a Packet Payload.

Referring to FIG. 8(*a*) above, among 4 bytes of the Packet Header of the GET_HFHID_DESCRIPTOR command, HB0 may include a packet type, HB1 may include a pipe type and a report type, and HB2 to HB3 may include a data length.

Here, 1 bit may be allocated to the pipe type, and when the value is 1, this may mean a control pipe. Meanwhile, since the GET_HFHID_DESCRIPTOR command does not require a report type, the report type may be set to 0.

Hereinafter, the structure of HFHID_DESCRIPTOR response message will be described in detail.

FIGS. 9 and 10 illustrate a message format of HFHID_DESCRIPTOR which is a response message to the GET_HFHID_DESCRIPTOR command as embodiments to which the present invention is applied.

First, HFHID_DESCRIPTOR message may include a Packet Header of 4 byte size and a Packet Payload of L1+L2+9 byte size.

The HFHID_DESCRIPTOR message is a response message to the GET_HFHID_DESCRIPTOR command and may include at least one of an HID Descriptor, a Report Descriptor or an Optional Descriptor.

Referring to FIG. 9 above, among 4 bytes of the Packet Header of the HFHID_DESCRIPTOR message, HB0 may include a packet type, HB1 may include a pipe type and a report type, and HB2 to HB3 may include a data length.

Here, 1 bit may be allocated to the pipe type, and when the value is 1, this may mean a control pipe. Meanwhile, since the HFHID_DESCRIPTOR message does not require a report type, the report type may be set to 0.

In addition, referring to FIG. 10 above, each of bytes included in the Packet Payload of the HFHID_DESCRIPTOR message may be configured as below.

DB0 may include bcdHID indicating a number of identifying the HID class standard, DB1 may include bCountryCode indicating a number of identifying a national code of localized hardware, DB2 may include bNumDescriptors indicating a number of specifying a number of class descriptors, DB3 may include bDescriptorType indicating a type of Report Descriptor, DB4 to DB5 may include wDescriptorLength(L1) indicating a total size of Report Descriptor, DB6 to DB(L1+5) may include ReportDescriptors indicating Report Descriptor data, DB(L1+6) may include bDescriptorType indicating a type of Optional Descriptor (e.g., physical descriptor), DB(L1+7) to DB(L1+8) may include wDescriptorLength(L2) indicating a total size of Optional Descriptor, and DB(L1+9) to DB(L1+L2+9) may include OptionalDescriptors indicating Optional Descriptor data.

FIGS. 11 and 12 illustrate a message format of GET_REPORT command for obtaining report data and a schematic transmission procedure as embodiments to which the present invention is applied.

A source device may transmit GET_REPORT message in order to obtain Initial Configuration information of an HID device. For example, the Initial Configuration information may include a request type and Report Data for a specific Report ID.

First, referring to FIG. 11, the GET_REPORT message may include a Packet Header of 4 byte size and a Packet Payload of 1 byte size.

Referring to FIG. 11(*a*), among 4 bytes of the Packet Header of the GET_REPORT message, HB0 may include a packet type, HB1 may include a pipe type and a report type, and HB2 to HB3 may include a data length.

Here, 1 bit may be allocated to the pipe type, and when the value is 1, this may mean a control pipe. 2 bits may be allocated to the report type, and 00 may set as a reserved region, 01 may set as an input report, 01 may set as an output report, and 11 may set as a feature report.

In addition, referring to FIG. 11(*b*) above, the packet payload of the GET_REPORT message may be 1 byte, and DB0 may include ReportID.

Referring to FIG. 12, the source device (HID host) may request the GET_REPORT message to the sink device (HID device) in order to obtain Report Data for the request type and the specific Report ID (step, S1210).

In response to the request, the sink device (HID device) may transmit REPORT_DATA to the source device (HID host) (step, S1220).

Hereinafter, a structure of REPORT_DATA response message will be described in detail.

FIG. 13 illustrates a message format of a response message REPORT_DATA for GET_REPORT command as an embodiment to which the present invention is applied.

In response to the GET_REPORT message, a sink device may transmit REPORT_DATA message including a request type and data for a specific Report ID to a source device.

The REPORT_DATA message may include a Packet Header of 4 byte size and a Packet Payload of L byte size.

FIG. 13(*a*) illustrates a Packet Header of the REPORT_DATA message and FIG. 13(*b*) illustrates a Packet Payload of the REPORT_DATA message.

Referring to FIG. 13(*a*), among 4 bytes of the Packet Header of the REPORT_DATA message, HB0 may include a packet type, HB1 may include a pipe type and a report type, and HB2 to HB3 may include a data length. In addition, referring to FIG. 13(*b*), DB0, DB(L-1) may include a packet payload.

Here, 1 bit may be allocated to the pipe type, and when the value is 0, this may mean a control pipe, and when the value is 1, this may mean an interrupt pipe. 2 bits may be allocated to the report type, and 00 may set as a reserved region, 01 may set as an input report, 01 may set as an output report, and 11 may set as a feature report.

Referring to FIG. 13(*b*), DB0 includes Report ID and DB1 to DB(L-1) include report data. For example, the Report ID may be existed in the case that the Report ID is shown in a report descriptor with respect to a specified Report Type. In addition, the content of USB HID may be applied to the report data.

FIG. 14 illustrates a message format of SET_REPORT for transmitting report data in relation to a specified report ID as an embodiment to which the present invention is applied.

A source device may determine operable configuration information of the source device by comparing the initial configuration information of a sink device and configuration information of the source device. In addition, the source device may transmit SET_REPORT message to the sink device in order to set the operable configuration information.

The SET_REPORT message may include a Packet Header of 4 byte size and a Packet Payload of L byte size.

FIG. 14(*a*) illustrates a Packet Header of the SET_REPORT message and FIG. 14(*b*) illustrates a Packet Payload of the SET_REPORT message.

Referring to FIG. 14(*a*), among 4 bytes of the Packet Header of the REPORT_DATA message, HB0 may include a packet type, HB1 may include a pipe type and a report type, and HB2 to HB3 may include a data length. In addition, referring to FIG. 14(*b*), DB0, . . . , DB(L-1) may include a packet payload.

Here, 1 bit may be allocated to the pipe type, and when the value is 1, this may mean a control pipe. 2 bits may be allocated to the report type, and 00 may set as a reserved region, 01 may set as an input report, 01 may set as an output report, and 11 may set as a feature report.

Referring to FIG. 14(*b*), DB0 includes Report ID and DB1 to DB(L-1) include report data. For example, the Report ID may be existed in the case that the Report ID is indicated in a report descriptor with respect to a specified Report Type. In addition, the content of USB HID may be applied to the report data.

FIGS. 15 to 17 illustrate a detailed structure of a response message REPORT_DATA for GET_REPORT command as embodiments to which the present invention is applied.

FIG. 15 illustrates a detailed structure REPORT_DATA, and the detailed description therefor is described in FIG. 16 and FIG. 17.

The REPORT_DATA may include at least one of a Feature Report for device configuration information of FIG. 16(*a*), Input Report1 for a digitizer of FIG. 16(*b*), or Input Report2 for a consumer device of FIG. 16(*c*).

Referring to FIG. 16(*a*), the Feature Report for device configuration information may include at least one of ContactCountMax 1510 indicating a maximum number of a simultaneous contact that is detectable by the digitizer or DeviceMode 1520 indicating a device input mode. Each of the ContactCountMax 1510 and the DeviceMode 1520 may be constructed by 4 bits. Here, the Feature Report for the device configuration information may mean a maximum number of multi touch contact which is supportable by a sink device, for example.

In addition, the DeviceMode 1520 may include three modes. For example, mode 0 may indicate a mouse, mode 1 may indicate an HID single touch or a single input device such as a pen device, and mode 2 may indicate a multi input device. Here, for mode 0, in the case that both of a keyboard and a mouse are based on touch, a mode use in which a mouse is a default is needed to be supported, and a touch keyboard function should not be supported in mode 0. Further, for mode 3, an example of the multi input device may include an HID touch device that supports a contact ID and a maximum number of multi touch contacts.

Referring to FIG. 16(*b*), Input Report1 for a digitizer may include at least one of ContactCount 1520, ContactIdentifier 1521, X 1522 and Y 1523.

The ContactCount 1520 indicates a current contact number that the digitizer discovers and reports, the ContactIdentifier 1521 indicates an identifier in relation to a contact, X 1522 indicates a linear translation in the X direction and Y 1523 indicates a linear translation in the Y direction.

Referring to FIG. 17, Input Report2 for a consumer device may include various functions of an HID device. For example, Input Report2 for the consumer device may include at least one of Power indicating power source on/off, a number pad in a range of 0 to 9, channel up/down, volume up/down, mute indicating silence of sound, closed caption enabling a subtitle function, Quit for getting out of a current mode, Selection Back returnable to a recently selected channel or mode, color buttons (Red, Blue, Yellow and Green) for performing individual functions, Voice command for performing a voice command.

FIG. 18 illustrates a flowchart for processing data of a Human Interface Device (HID) on a high-speed interface by a sink device as an embodiment to which the present invention is applied.

The present invention provides a method for processing Human Interface Device (HID) data on a high-speed interface by a sink device.

First, a sink device may permit to use the HID device on a user interface of the sink device in order to control a user interface of a source device (step, S1810).

The sink device may receive a request for initial configuration information of the HID from the source device (step, S1820).

In response to the request, the sink device may transmit the initial configuration information of the HID to the source device (step, S1830).

The sink device may receive operable configuration information from the source device (step, S1840). Here, the operable configuration information indicates configuration information of the source device which is matched to the initial configuration information of the HID.

Based on the operable configuration information, the sink device may control the user interface of the source device according to an input signal of the HID (step, S1850).

In this case, the input signal of the HID may be transmitted to the source device through report data, and the report data may include device configuration information, digitizer information and consumer device information.

Here, the device configuration information may include a maximum number of simultaneous touches detectable by a digitizer and an input mode of the HID. For example, the input mode of the HID may include at least one of a first mode indicating a mouse, a second mode indicating a single input touch or a third mode indicating a multi input touch.

The digitizer information may include at least one of a touch number currently detected, a touch identifier, linear translation information in the X direction or linear translation information in the Y direction.

As another embodiment, before receiving a request for the initial configuration information of the HID, the method (i.e. sink device) may receive a request for HID Descriptor and Report Descriptor from the source device. Here, the HID Descriptor indicates header information of the HID data and the Report Descriptor indicates payload information of the HID data.

Further, according to the request, the HID Descriptor and the Report Descriptor may be transmitted to the source device.

Here, the header information of the HID data may include pipe type information and report type information.

In addition, the pipe type information may indicate whether it is a synchronous report or asynchronous report, and the report type information may include at least one of a first type indicating low-latency data provided from the HID, a second type indicating low-latency data provided from an HID host or a third type indicating application-specific data.

FIG. 19 illustrates a flowchart for processing data of a Human Interface Device (HID) on a high-speed interface by a source device as an embodiment to which the present invention is applied.

The present invention provides a method for processing Human Interface Device (HID) data on a high-speed interface by a source device.

The source device may transmit a command for requesting initial configuration information of a Human Interface Device (HID) (step, S1910).

The source device may receive the initial configuration information of the HID according to the command (step, S1920).

Based on the initial configuration information of the HID, the source device may determine configuration information which is operable in the source device (step, S1930). Here, the operable configuration information may indicate configuration information of the source device which is matched to the initial configuration information of the HID.

The source device may transmit the operable configuration information to the HID (step, S1940).

In this case, based on the operable configuration information, a user interface of the source device may be controlled by the HID.

As such, the display device that is available to connect a Human Interface Device (HID; e.g., a keyboard, a mouse, etc.) as well as a touch function may forward touch data or data received from the HID to a contents providing device like a set-top box through a high-speed multimedia wired interface, and accordingly, may provide a convenience in use and an improved use experience.

So far, the preferred embodiment of the present invention described above is disclosed for the purpose of an example. It will be understood to those skilled in the art that an improvement, a modification, a substitution, an addition, or the like is available for various other embodiments within the inventive concept and the inventive scope provided by the attached claims below.

The invention claimed is:

1. A method for processing a signal of a Human Interface Device (HID) on a high-speed interface performed by a sink device, the method comprising:
    permitting, by the sink device, a use of the HID on a user interface of the sink device to control a user interface of a source device, wherein the user interface of the source device is displayed on the sink device;
    receiving, from the source device, a request for a HID Descriptor and a Report Descriptor,
    wherein the request for the HID descriptor and the Report Descriptor comprise a packet header of 4 Bytes size without a packet payload, and
    wherein the HID Descriptor indicates header information of HID data and the Report Descriptor indicates payload information of the HID data;
    transmitting, to the source device, the HID Descriptor and the Report Descriptor;
    receiving, from the source device, a request for initial configuration information of the HID;
    in response to the request, transmitting, to the source device, the initial configuration information of the HID;
    receiving, from the source device, operable configuration information, wherein the operable configuration information indicates configuration information of the source device which is matched to the initial configuration information of the HID; and transmitting, to the source device, a control signal based on an input signal received from the HID on the user interface of the sink device based on the operable configuration information.

2. The method of claim 1, wherein the control signal includes report data, and
wherein the report data includes device configuration information, digitizer information and consumer device information.

3. The method of claim 2, wherein the device configuration information includes a maximum number of simultaneous touches detectable by a digitizer and an input mode of the HID, and
wherein the input mode of the HID includes at least one of a first mode indicating a mouse, a second mode indicating a single input touch or a third mode indicating a multi input touch.

4. The method of claim 2, wherein the digitizer information includes at least one of a touch number currently detected, a touch identifier, linear translation information in the X direction or linear translation information in the Y direction.

5. The method of claim 1, wherein the header information of the HID data includes pipe type information and report type information,
wherein the pipe type information indicates whether the pipe type is a synchronous report or asynchronous report, and
wherein the report type information includes at least one of a first type indicating low-latency data provided from the HID, a second type indicating low-latency data provided from an HID host or a third type indicating application-specific data.

6. A sink device for processing a signal of a Human Interface Device (HID) on a high-speed interface, the sink device comprising:
a control unit configured to permit a use of the HID on a user interface of a sink device to control a user interface of a source device, wherein the user interface of the source device is displayed on the sink device, and the control unit is functionally connected to an A/V input/output interface; and
the A/V input/output interface configured to:
receive a request for a HID Descriptor and a Report Descriptor from the source device, and transmit the HID Descriptor and the Report Descriptor to the source device,
wherein the request for the HID descriptor and the Report Descriptor comprise a packet header of 4 Bytes size without a packet payload, and
wherein the HID Descriptor indicates header information of HID data and the Report Descriptor indicates payload information of the HID data,
receive a request for initial configuration information of the HID from the source device,
in response to the request, transmit the initial configuration information of the HID to the source device,
receive operable configuration information from the source device, and
transmit a control signal based on an input signal received from the HID on the user interface of the sink device based on the operable configuration information,
wherein the operable configuration information indicates configuration information of the source device which is matched to the initial configuration information of the HID.

7. The sink device of claim 6, wherein the control signal includes report data, and
wherein the report data includes device configuration information, digitizer information and consumer device information.

8. The sink device of claim 7, wherein the device configuration information includes a maximum number of simultaneous touches detectable by a digitizer and an input mode of the HID, and
wherein the input mode of the HID includes at least one of a first mode indicating a mouse, a second mode indicating a single input touch or a third mode indicating a multi input touch.

9. The sink device of claim 7, wherein the digitizer information includes at least one of a touch number currently detected, a touch identifier, linear translation information in the X direction or linear translation information in the Y direction.

10. The sink device of claim 6, wherein the header information of the HID data includes pipe type information and report type information,
wherein the pipe type information indicates whether the pipe type is a synchronous report or asynchronous report, and
wherein the report type information includes at least one of a first type indicating low-latency data provided from the HID, a second type indicating low-latency data provided from an HID host or a third type indicating application-specific data.

* * * * *